(12) United States Patent
Jones et al.

(10) Patent No.: US 8,914,480 B1
(45) Date of Patent: Dec. 16, 2014

(54) METHOD AND DEVICE FOR TRANSPARENT INTERCEPTION OF SOCKET CONNECTIONS

(75) Inventors: Peter Frederico Jones, Ottawa (CA); Mark Brady Jorgenson, Ottawa (CA); Robert William Johnson, Ottawa (CA); William Michael Bova, Ottawa (CA); Erin Irene Hayhoe, Manotick (CA)

(73) Assignee: 6020356 Canada Inc., Ottawa (CA)

( * ) Notice: Subject to any disclaimer, the term of this patent is extended or adjusted under 35 U.S.C. 154(b) by 1313 days.

(21) Appl. No.: 12/148,565

(22) Filed: Apr. 21, 2008

Related U.S. Application Data

(62) Division of application No. 10/270,870, filed on Oct. 15, 2002, now abandoned.

(60) Provisional application No. 60/328,790, filed on Oct. 15, 2001.

(51) Int. Cl.
*G06F 15/173* (2006.01)
*H04L 12/54* (2013.01)
*H04L 12/26* (2006.01)

(52) U.S. Cl.
CPC .............. *H04L 12/5689* (2013.01); *H04L 43/04* (2013.01)
USPC ............ 709/223; 709/224; 709/227; 709/228

(58) Field of Classification Search
CPC ........................... H04L 12/5689; H04L 43/04
See application file for complete search history.

(56) References Cited

U.S. PATENT DOCUMENTS

| | | | |
|---|---|---|---|
| 5,550,982 A | 8/1996 | Long et al. | |
| 5,922,040 A | 7/1999 | Prabhakaran | |
| 5,930,473 A | 7/1999 | Teng et al. | |
| 6,046,980 A * | 4/2000 | Packer | 370/230 |
| 6,101,180 A | 8/2000 | Donahue et al. | |
| 6,119,163 A | 9/2000 | Monteiro et al. | |
| 6,173,312 B1 * | 1/2001 | Atarashi et al. | 709/203 |
| 6,189,039 B1 | 2/2001 | Harvey et al. | |
| 6,529,477 B1 * | 3/2003 | Toporek et al. | 370/235 |
| 6,598,071 B1 * | 7/2003 | Hayashi et al. | 709/203 |
| 6,647,427 B1 * | 11/2003 | Watanabe | 709/239 |
| 6,785,704 B1 * | 8/2004 | McCanne | 718/105 |
| 6,894,979 B1 * | 5/2005 | Lee | 370/241 |
| 6,981,278 B1 | 12/2005 | Minning et al. | |
| 7,707,300 B1 * | 4/2010 | Champagne | 709/231 |
| 2002/0004819 A1 * | 1/2002 | Agassy et al. | 709/203 |
| 2002/0038382 A1 * | 3/2002 | Ryu et al. | 709/238 |
| 2005/0021821 A1 * | 1/2005 | Turnbull et al. | 709/232 |

OTHER PUBLICATIONS

Multicast Transport Protocols: A Survey and Taxonomy, Katia Obraczka, IEEE Communications Magazine, Jan. 1998, pp. 94-102.

(Continued)

*Primary Examiner* — Dhairya A Patel
(74) *Attorney, Agent, or Firm* — Gowlings Lafleur Henderson, LLP

(57) ABSTRACT

A method and device is provided for managing data transmission on a network. The device includes Transparent Interceptor for transparently intercepting socket connections from first parties to one or more second parties. A signal socket connection is established to each second party. When one or more first parties request a data stream to a second party, the device distributes the data stream obtained from the second party through the single socket connection to one or more first parties. Data processor of the device may operate on data contents from the first or second party. A customized protocol may be used for the data transmission.

20 Claims, 13 Drawing Sheets

(56) References Cited

OTHER PUBLICATIONS

TCP/IP Enhancements for Satellite Networks, Ghani, et al., IEEE Communications Magazine, Jul. 1999, pp. 64-72.

On TCP Performance in a Heterogeneous Network: A Survey, Barakat, et al., IEEE Communications Magazine, Jan. 2000, pp. 40-46.

Challenges and Opportunities of Delivering IP-Based Residential Television Services, Hastings, et al., IEEE Communications Magazine, Nov. 2000, pp. 86-92.

Satellite Internet Services Using DVB/MPEG-2 and Multicast Web Caching, Linder, et al., IEEE Communications Magazine, Jun. 2000, pp. 156-161.

A Combined Input and Output Queued Packet-Switched System based on PRIZMA Switch-on-a-Chip Technology, Minkenberg, et al., IEEE Communications Magazine, Dec. 2000, pp. 70-77.

Satellite-Based Internet: A Tutorial, Hu, et al., IEEE Communications Magazine, Mar. 2001, pp. 154-162.

The PacketCable Architecture, Miller et al., IEEE Communications Magazine, Jun. 2001, pp. 90-96.

Optimizing TCP Forwarder Performance, Spatscheck, et al., IEEE/ACM Transactions on Networking, vol. 8, No. 2, Apr. 2000, pp. 146-157.

Video Staging: A Proxy-Server-Based Approach to End-to-End Video Delivery over Wide-Area Networks, Zhang, et al, IEEE/ACM Transactions on Networking, vol. 8, No. 4, Aug. 2000, pp. 429-442.

Distributed Servers Architecture for Network Video Services, Chan, et al., IEEE/ACM Transactions on Networking, vol. 9, No. 2, Apr. 2001, pp. 125-135.

\* cited by examiner

METHOD AND DEVICE FOR TRANSPARENT INTERCEPTION OF SOCKET CONNECTIONS

CROSS-REFERENCE TO RELATED APPLICATION

The present application is a divisional application of U.S. application Ser. No. 10/270,870, filed Oct. 15, 2002 now abandoned, which claims the benefit of U.S. Provisional Application No. 60/328,790, filed Oct. 15, 2001, the subject matter of which is herein incorporated by reference in its entirety.

FIELD OF THE INVENTION

The present invention relates to the field of computer networks, and more particularly a method and device for transparently managing data transmission on a digital packet network.

BACKGROUND OF THE INVENTION

Demand for multimedia services has been growing around the world. Internet technology that has been developed on a worldwide basis plays a key role in addressing this demand. Protocols used within the Internet have key limitations in their ability to effectively manage the flow of data. These limitations result in less than ideal transmission of data over bearers that have less than ideal delay or error characteristics, and inefficient dissemination of data from a single entity to multiple end users.

Internet protocols were designed for use in high capacity wired networks. When these same protocols are used in wireless networks, either terrestrial or satellite, degradation of services often results from the interaction of the protocols and the delay or error characteristics of the media. While special solutions have been proposed for wireless links, means for mitigating the protocol related degradation over wireless links would allow the installed internet base to be accessible to wireless users with sufficient bandwidth.

In order to meet the demand for multimedia services on the Internet, it is necessary to distribute multimedia content to an unlimited number of users in response to their requests. Typically, Internet multimedia technology for audio and video uses socket connections between a broadcaster (server) and customers (clients). The socket establishes a single connection. Therefore, the broadcast server must generally handle each data stream for each customer separately. That may increase the load on the broadcast server and can easily overwhelm both the broadcast server as well as the Internet backbone.

One of the prior art solutions is that a client receiving a broadcast data stream will forward that data to the other clients. However, that requires the client to communicate with the other clients and hence leaves the system vulnerable to the reliable operation of the clients.

Therefore it is desirable to provide a method and device that can manage traffic efficiently for the provision of multimedia services.

SUMMARY OF THE INVENTION

It is an object of the invention to provide a method and device for managing data transmission on a network for purposes such as broadcasting, content modification, or protocol modification.

In accordance with an aspect of the present invention, there is provided a method of managing data transmission on a network with a plurality of first parties communicating with a second party through the network using socket connections, which has the steps of: transparently intercepting a socket connection originating from each first party to a second party; transparently establishing an endpoint to a socket connection to each first party; and generating a single socket connection to the second party to communicate with the second party.

In accordance with a further aspect of the present invention, there is provided a method of managing data transmission on a network with a plurality of requestors communicating with a responder through the network using socket connections for requesting a data stream from the responder. The method has the steps of: identifying a socket connection originating from each requestor to a responder; transparently intercepting the socket connection from each requestor to the responder; transparently establishing an endpoint to a socket connection to each requestor; generating a single socket connection to the responder to obtain a single data stream from the responder; and distributing the data stream obtained from the single socket connection to more than one requesters through their socket connections.

In accordance with a further aspect of the present invention, there is provided a device for managing data transmission on a network. The network includes a plurality of first parties communicating a second party through the device using socket connections. The device has: an interceptor for transparently intercepting a socket connection from each first party to a second party and establishing an endpoint to a socket connection to each first party; and a regenerator for generating a single socket connection to the second party to communicate with the second party.

According to one aspect of the present invention, the device on the network can obtain a single data stream from a server (such as, broadcast server) and provide it to multiple clients.

According to another aspect of the present invention, the device on the network can transparently intercept socket connections and can process data contents or use a customized protocol. For example, a protocol that was optimized for transmitting data over a long-delay satellite link might be inserted when the data was relayed over a satellite circuit.

Methods of transparently intercepting, data duplicating and modifying socket connections allow for the use of network enhancements, specific to the media or application, between the endpoints of the sockets while retaining the appearance of a normal network connection to the final application.

The data transmission can be managed at an interconnection point of the network without any load on server sides and client sides.

Other aspects and features of the present invention will be readily apparent to those skilled in the art from a review of the following detailed description of preferred embodiments in conjunction with the accompanying drawings.

BRIEF DESCRIPTION OF THE DRAWINGS

The present invention will be further understood from the following description with reference to the drawings in which.

DETAILED DESCRIPTION OF THE PREFERRED EMBODIMENT

Figure 1:
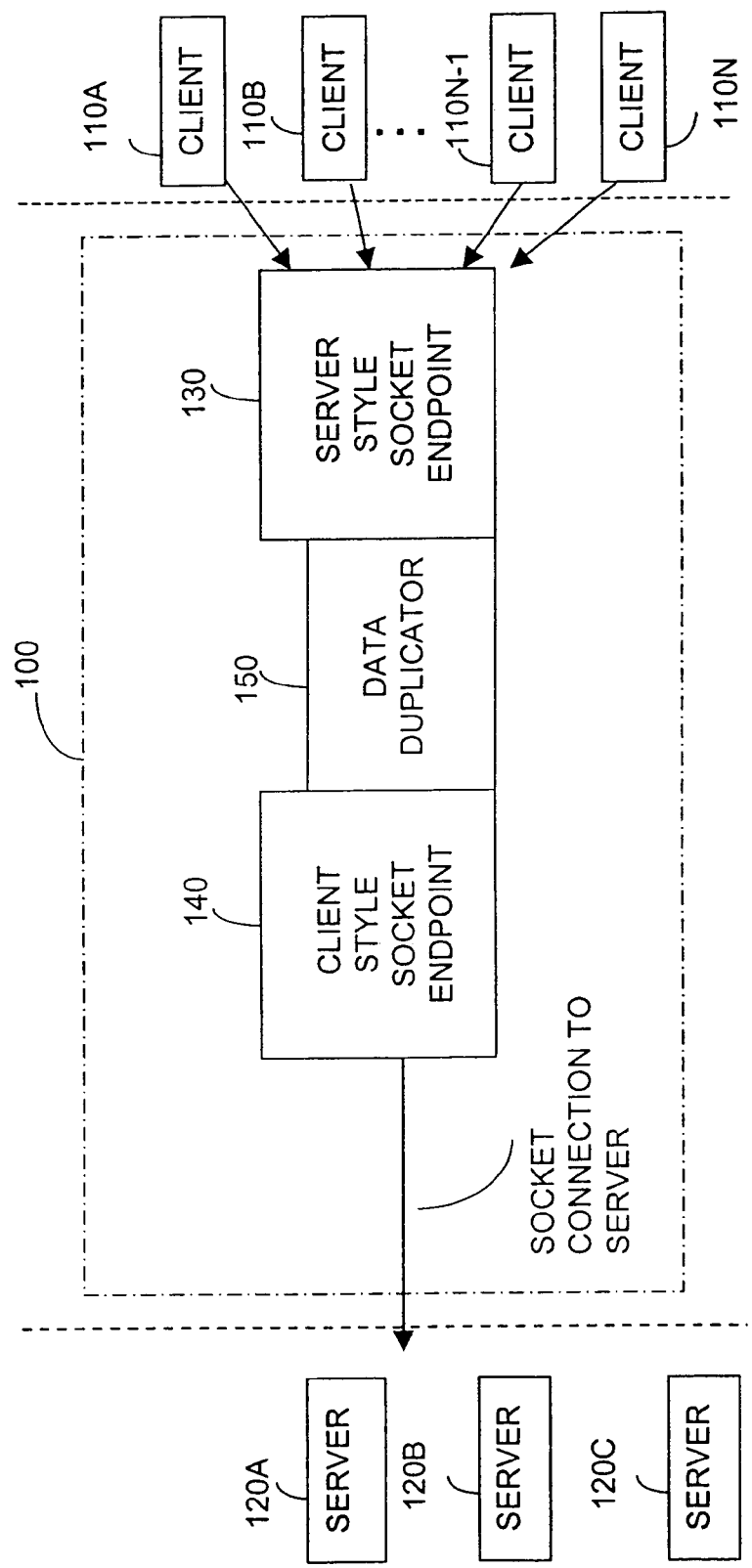
FIG. 1 is a block diagram showing an interception system in accordance with a first embodiment to the present invention.

FIG. 1 is a block diagram showing an interception system 100 in accordance with a first embodiment of the present invention. The network shown in FIG. 1 includes multiple clients 110A to 110N and servers 120A to 120C. The clients communicate with the server using a communication protocol, such as TCP/IP or UDP/IP. In FIG. 1, arrows show data flow from a client (i.e. requester) that originates a connection to a server (i.e. responder) that receives the connection. Data from the server to the client can be handled in the same manner as that of the data from the client to the server.

A stream concentrator (i.e. the interception system) 100 is provided at a network interconnect point between the clients and servers. The stream concentrator 100 may be included in a device (such as router, switch, gateway) which has routing functionality in a digital packet network.

The stream concentrator 100 has "one to many" functionality such that a single data stream is supplied to multiple clients, and multiple incoming streams are supplied to a server as a single data stream without any change of the configurations in the clients and servers.

In some applications, the data stream from client to server may be of a much lower rate than the data stream in the other direction, and might consist of something as minimal as the client simply announcing its presence and requesting stream data from the server.

For the "one to many" functionality, the stream concentrator 100 performs transparent interception and data duplication (data duplicator 150).

The transparent interception (Interceptor) describes a combination of (packet) redirection and application transparency. This term refers to the ability of a system (using combinations of the techniques disclosed herein) to identify a target data stream and to form the stream connection with its end point (i.e. the application at the end of the stream) in such a way that the end point is unaware that it is not directly connected to its intended destination.

The packet redirection is a method of taking packets and sending selected packets to a destination other than their originally intended destination in order to perform tasks such as the transparent interception of streams. The redirection is a method of sending selected incoming data to a destination other than their originally intended destination.

Port and/or (Internet Protocol: IP) address modification is a method of creating packet redirector functionality by modifying source and/or destination ports and/or (IP) addresses to allow system packet routing functionality (or enhanced system packet routing functionality) to send those packets to a destination other than their originally intended destination. Port number modification only applies to packets that include port numbers, e.g. TCP and UDP packets. The technique used in the port and/or address modification can be applied to non-IP and other forms of network addresses as well as IP. The Application transparency refers to a situation where applications at either the client or server (or other endpoint entity) or both ends of the data stream can, if desired, be made unaware that they are connected to or through anything other than a standard network connection. Transparency or non-transparency may depend on underlying network systems. The endpoints may be totally unaware that they are connected to a stream concentrator or through a connection using protocol modification as described below. In a less stringent application of the concept, a client application may be optimized for use with devices such as stream concentrator, but clients still form their connection by only needing to specify the address (and possibly the port number) of the server.

When a client requests a data stream to a server and a socket connection originating from the client passes through the stream concentrator 100, the stream concentrator 100 inspects the socket connection and determines if the socket connection should be intercepted. If yes, the stream concentrator 100 transparently intercepts the socket connection and establishes its own socket connection to the client. The stream concentrator 100 becomes a virtual server (i.e. endpoint) to the client. The client is unaware that it is connected to anything but the destined server.

At the same time, the stream concentrator 100 opens a socket connection to the server to obtain a single data stream. The data from the server is immediately sent to the client through the established socket connection. When additional clients request the same data stream through the stream concentrator 100, the stream concentrator 100 transparently redirects them to the socket connection that the stream concentrator has opened. The data flowing through the opened socket connection is immediately sent to the additional clients. A new socket connection to the server is not established. The additional clients are also unaware that they are connected to anything but the destined server. Data flow from a client to the server may also be intercepted in the same manner.

The socket connection is a stream of packets carrying data between two networked entities such as a server and a client. The socket connection includes the stream using any type of protocol, such as Transmission Control Protocol (TCP) or User Datagram Protocol (UDP)

As a specific socket connection is split from other socket connections, the socket connections that are not intercepted are not disrupted. The stream concentrator 100 may, however, intercept all socket connections.

This process places little computational load on the stream concentrator 100. This entire functionality can be created as a small application that can be run in the stream concentrator's user space, as part of the network stack, or be directly connected to the stream concentrator's network ports without use of the stack, or any combination of the above.

The stream concentrator 100 can transparently intercept a socket connection for broadcast. Broadcast is a one-to-many method of distributing data, where "many" is an unlimited number of recipients and loading of the broadcast source is unaffected (i.e. loaded) or only marginally affected (loaded) by the number of listeners or clients. "unaffected (loaded)" means that source may have no burden imposed on it (i.e. CPU usage, power usage, bandwidth usage etc) when clients listen to the broadcast are increasing. "marginally affected (loaded)" means that as more clients listen to the broadcast, there may be a slight increase in server loading, but this increase in loading may be much less than a simple of scaling of server loading. The stream concentrator 100 can prevent an excessive number of these connections from reaching and overloading the server.

The broadcast is different from unicast (one-to-one) or multicast (one-to-N, where N is limited by various restrictions), where the source must generally handle a separate stream for each unicast stream or multicast stream, and hence is loaded in some proportion to the number of listeners. In the stream concentrator 100, unicast and multicast types of connections can be used in various parts of the data transmission pathway.

For example, when the client 110A attempts to access a broadcast data stream from the (broadcast) server 120A through the stream concentrator 100, the stream concentrator 100 intercepts the socket connection originating from the client 110A. A server style socket connection is established between the client 110A and the server style socket connection endpoint 130 of the stream concentrator 100. The stream concentrator 100 effectively becomes a socket server to the client 110A. The client 110A is unaware of this interception.

The stream concentrator 100 then opens a socket connection to the server 120A. A client style socket connection is established between the server 120A and the client style socket connection endpoint 140 of the stream concentrator 100. Once the socket connection between the stream concentrator 100 and the server 120A is established, the stream concentrator 100 receives the data coming from the server 120A and immediately sends the data to the client 110A through the socket connection that the stream concentrator 100 has established.

The above process is repeated for every socket connection passing through the stream concentrator 100 unless the socket connection is intended for a server address and port number to which the stream concentrator 100 already has established its own connection.

When additional clients 110N-1 and 110N request the broadcast data from the server 120A and the socket connection from the stream concentrator 100 to the server 120A is open, the stream concentrator 100 transparently establishes the endpoints to the socket connections to them and starts duplication process. The data duplicator 150 duplicates the broadcast data stream that is being received from the server 120A. In the duplication mode, the stream concentrator 100 does not establish a new socket connection to the server 120A. The duplicated data streams are immediately sent to the clients 110N-1 and 110N. The data from the server 120A is simply readdressed to new clients. Therefore, multiple clients can simultaneously obtain broadcast data from a server through a single data stream, even though those clients may specify the server's address and port number (if applicable). All clients are unaware that they are connected to anything other than the broadcast server 120A.

One simple method of identifying streams that are to be considered broadcast, and therefore to be duplicated in the stream concentrator 100, is to assign a range of port numbers for broadcast streams. In this case, any stream accessing ports within the broadcast port range numbers on any server may be considered broadcast and is to be duplicated when multiple clients request the broadcast data.

Alternatively, the stream concentrator 100 may maintain a list of IP address and port numbers of broadcast servers.

The use of an identifier in the first and/or subsequent socket packets (in one or the other or both directions) of streams is another method of designating which streams are to be duplicated.

When only a single client is requesting a stream, the system may either handle the stream to that client in the same way as it handles multiple clients (i.e. using all the steps used for multiple clients) or alternatively may bypass some of the functionality used to handle multiple clients (such as redirecting and/or duplication) and simply pass the stream between server and client with little or no intermediate processing or intervention.

When TCP/IP sockets are intercepted, TCP/IP packets originating from a client and destined to a broadcast server may be processed by replacing the broadcast server's destination IP address and port number with the IP number of the stream concentrator 100 and a known port number (the reverse occurs for packets on the return trip).

For UDP/IP, packets are intercepted in the similar manner to the TCP/IP. In this case, packets from the server may be individually duplicated and sent to each client.

Other IP or non-IP packets may be handled in a similar fashion.

The stream concentrator 100 may transparently intercept a socket connection when a "popular" data stream is requested. The stream concentrator 100 may keep a record of how many listeners have listened to (or are currently listening to) each data stream and use a threshold to determine if the stream is "popular". Once a client requests a data stream within the category of "popular", the stream concentrator 100 opens the socket connection to the server and may keep the socket connection to the server open even when no clients are connected.

The stream concentrator 100 may track usage of each stream over time and learn that the requested stream is popular at a certain time of day. In this case, the stream concentrator 100 keeps its established socket connection to obtain a popular data stream at least within the certain time of day to send it to multiple clients.

In the client-to-server direction, the stream concentrator 100 combines data streams from multiple clients to a server and forms a single stream to send it to the server.

The stream concentrator 100 may have functionality of creating a stream carrying data from a client or a server to the server or client or inserting data into the data stream sent to the server or the client.

The stream concentrator 100 may insert data into data streams sent to particular clients. The stream concentrator 100 may attach specific data intended for a particular client to data that every client receives. If the specific data is sensitive, the specific data may be encrypted and only the specific client knows the corresponding decryption key.

The stream concentrator 100 may split the data intended for particular clients and only send it to those particular clients. For example, the stream concentrator 100 may inspect the data stream and send it, based on the contents, only to the particular clients.

A plurality of stream concentrators can be provided at interconnection points between sections of a network, or between networks. Those stream concentrators can manage traffic between the sections or networks and reduce the number of individual streams carrying the data.

Figure 2:
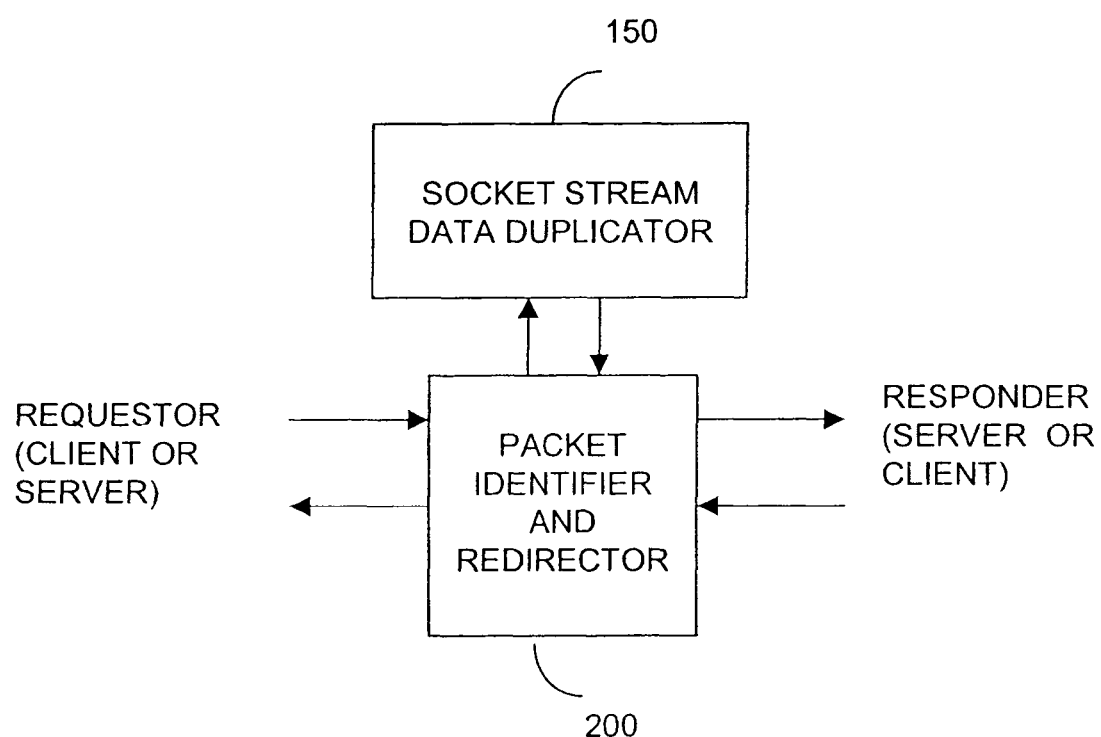
FIG. 2 is a block diagram showing an embodiment of the transparent redirection of the socket connection in the stream concentrator.

FIG. 2 is a block diagram showing a first embodiment of the transparent redirection to the socket connections of the stream concentrator 100. As shown in FIG. 2, a packet identifier and redirector 200 is one way of achieving the functionality of the transparent redirection to the socket connections of the transparent interceptor in the stream concentrator 100.

When packets pass through the packet identifier and redirector 200, the packet identifier and redirector 200 inspects them to determine whether the packets are part of a stream that should be intercepted. If yes, the packets are transparently redirected to the socket stream data duplicator 150. The socket stream data duplicator 150 duplicates incoming packets. The packet identifier and redirector 200 receives the output of the socket stream data duplicator 150 and sends it to entities which have requested that data, such as clients or servers. The data duplicator 150 may also have the functionality of inserting data, replacing incoming data, converting data or modifying protocol as described below.

When socket connections involve bi-directional handshaking and data flow, the packet identifier and redirector 200 works with the socket stream data duplicator 150 to ensure that return packets get transparently delivered to the intended recipient.

Figure 3:
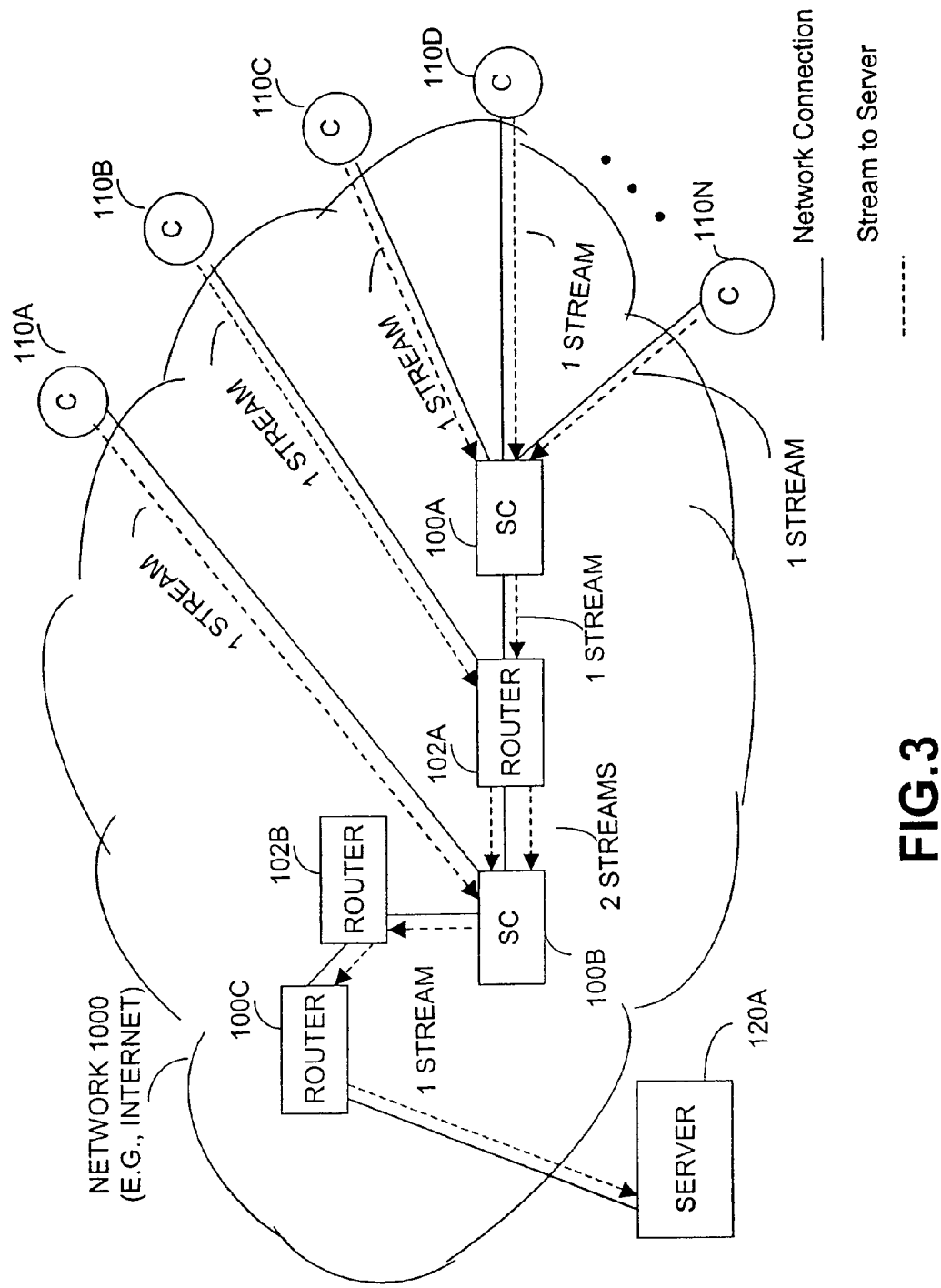
FIG. 3 is a schematic diagram showing a broadcasting network in accordance with an embodiment of the present invention.

FIG. 3 is a schematic diagram showing a network 1000 in accordance with a first embodiment of the present invention. In FIG. 3, arrows show data flow from a client (i.e. requester) that originates a connection to a server (i.e. responder) that receives the connection. Data from the server to the client flows along the same paths but in the opposite direction. In FIG. 3, C denotes a client and SC denotes a stream concentrator.

The network 1000 (e.g. Internet) includes the stream concentrators 100A and 100B and Routers 102A to 102C. Multiple clients 110A to 110N communicate with a server 120A through the network 1000.

The stream concentrators 100A and 100B have similar functionality to that of the stream concentrator 100 of FIG. 1 and have routing functionality. The stream concentrator 100A (and/or 100B) may be included in a router. The stream concentrator 100A (and/or 100B) may have functionality as pass-through devices on a network connection, such as a cable, fiber or other carrier.

The clients 110A to 110N create socket connections to access the data stream provided from the server 120A. These connections are routed by routers 102A to 102C. The routers 102A to 102C simply route network packets including streams. When streams pass through the stream concentrators 100A and 100B, streams designated for the same server are combined transparently. The stream concentrator 100A combines three streams from the clients 110C, 100D and 110N to form a single stream. The stream concentrator 100B combines one stream from the client 110A and two streams passing through the router 102A (originating from stream concentrator 100A and client 110B) to form a single stream. The server 120A handles a single stream.

When the clients 110A to 110N request broadcast data from the server 120A, the stream concentrator 100B transfers a signal broadcast data stream to the client 110A and two broadcast data streams to the router 102A based on a single data stream obtained from the server 120A. The router 102A transfers one of the broadcast data streams to the client 110B, and transfers the other to the stream concentrator 100A. Each of the clients 110C, 110D and 110N receives the broadcast data stream.

Figure 4:
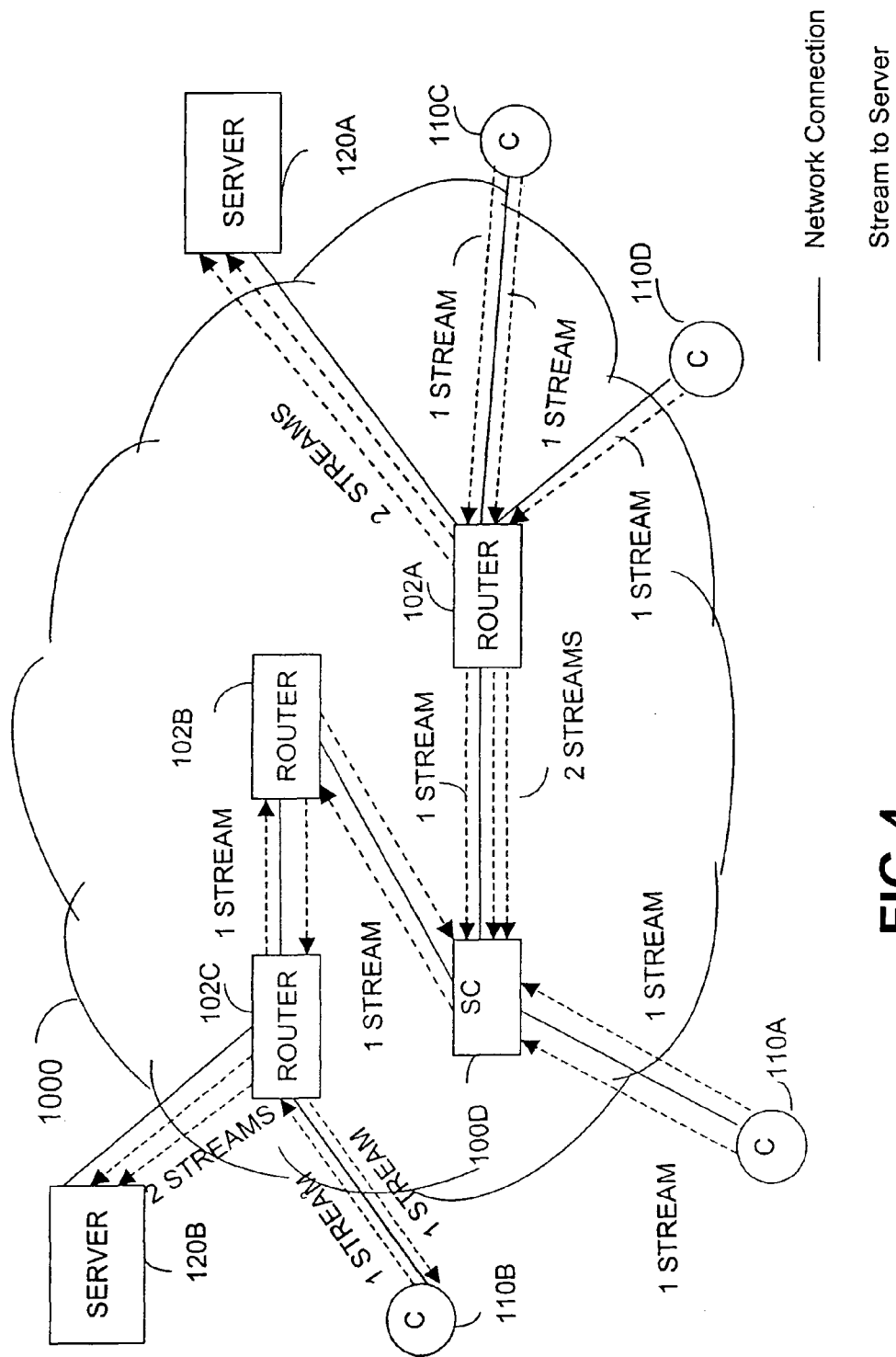
FIG. 4 is a schematic diagram showing another example of the broadcasting network.

FIG. 4 is a schematic diagram showing another example of the broadcasting network 1000. In FIG. 4, arrows show data flow from a client (i.e. requester) that originates a connection to a server (i.e. responder) that receives the connection. Data from the server to the client flows along the same paths but in the opposite direction. In FIG. 4, C denotes a client and SC denotes a stream concentrator FIG. 4 illustrates that two separate broadcast sources (server 120A and 120B) share the same stream concentrator 100D. Clients (e.g. 110A, 110B, and 110C) request broadcast data to the server 120A, and the clients (e.g. 110A, 110B, 110C, and 110D) request broadcast data to the server 120B. The stream concentrator 100D combines one or more incoming streams destined for a single Server. The stream concentrator 100D is similar to the stream Concentrator 100 of FIG. 1. The stream concentrator 100D simultaneously handles multiple streams for the clients and the servers, which are located in different locations across the network.

Transparent interception of socket connections by a device for applications such as protocol modification, policies implementation, encryption, decryption, compression, decompression, data conversion, data insertion, data replacement or other uses is described below.

The protocol modification is a method of modifying a protocol, such as TCP, for better performance under certain conditions. For example, protocol modification may be used to avoid TCP back-off resulting from delays over satellite channels by changing the protocol used over the degraded (by delay) portion of the connection.

Figure 5:
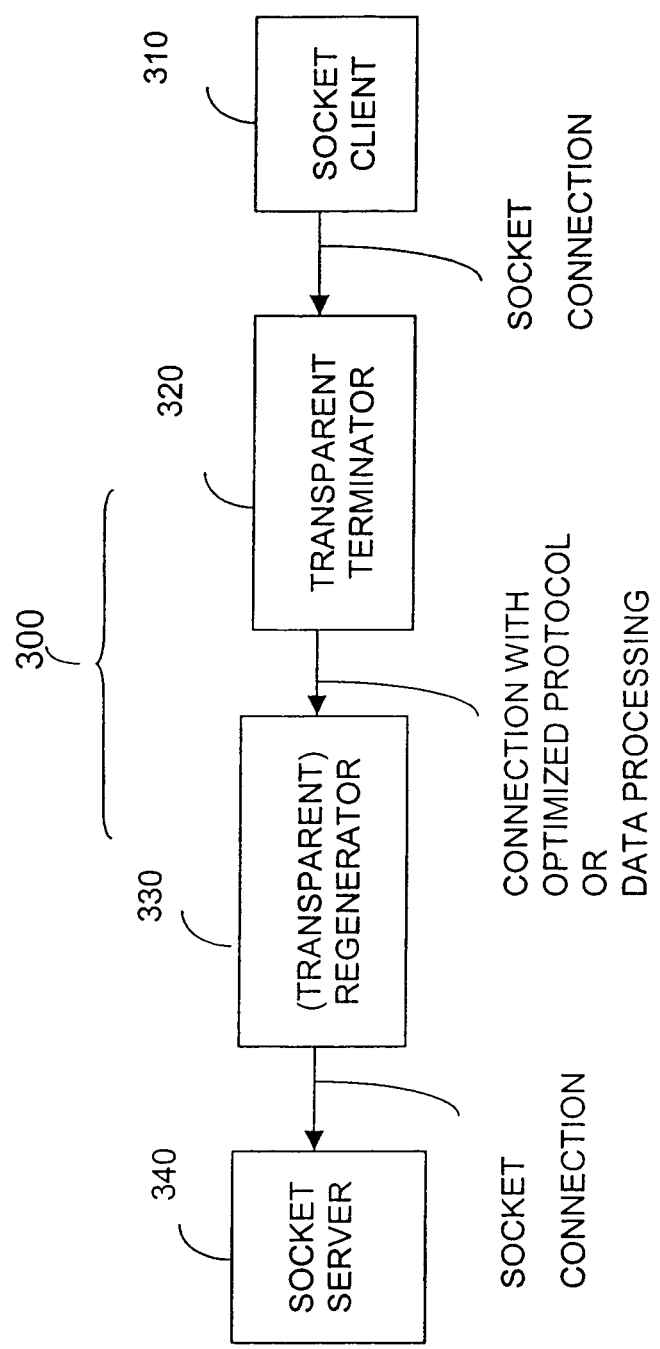
FIG. 5 is a block diagram showing an interception system in accordance with a second embodiment of the present invention.

FIG. 5 is a block diagram showing an interception system 300 in accordance with a second embodiment of the present invention. In FIG. 5, arrows show data flow from a socket client 310 originating a connection to a socket server 340. Data from the server 340 to the client 310 can be handled in the same manner as that of the data from the client 310 to the server 340.

The interception system 300 of FIG. 5 includes a transparent terminator 320 and a regenerator 330. The socket client 310 is connected to socket server 340 through the transparent terminator 320 and the regenerator 330. The transparent terminator 320 and the regenerator 330 are one way of achieving the transparent interceptor.

The transparent terminator 320 forms the server side connection of the intercepted socket stream from the client. The transparent terminator 320 effectively mimics the functionality of a server-like device.

The Regenerator 330 forms the connection between the interceptor and the server. The Regenerator effectively mimics the functionality of a client-like device.

The socket client 310 sends a socket connection to the socket server 340, which specifies the address and port number of the socket server 340. The transparent terminator 320 receives the socket connection and recognizes that this socket connection should be intercepted. In effect, the transparent terminator 320 becomes a virtual server to the socket client 310. The socket client 310 is unaware that the socket connection between the socket client 310 and the transparent terminator 320 is established.

The transparent terminator 320 now forms a connection to the regenerator 330. As described below, the connection between the transparent terminator 320 and the regenerator 330 may be established either through data processing subsystem or a communications link with an optimized communications protocol.

The regenerator 330 then opens a socket connection to the socket server 340 to become a client of the socket server 340. From the socket server's perspective, the regenerator 330 can communicate with a server either in a transparent manner or non-transparent manner.

In the transparent manner, the regenerator 340 pretends to be an actual socket client to the socket server 340. The socket client's address and port number (if applicable) specified by the socket connection sent from the socket client 310 is used as the source address of packets traveling from the regenerator 330 to the socket server 340.

In the non-transparent manner, the regenerator 330 uses its own address or an alternate address, which is not the socket client's address, and port number (if applicable) as the source address of packets traveling from the regenerator 330 to the socket server 340.

Figure 6:
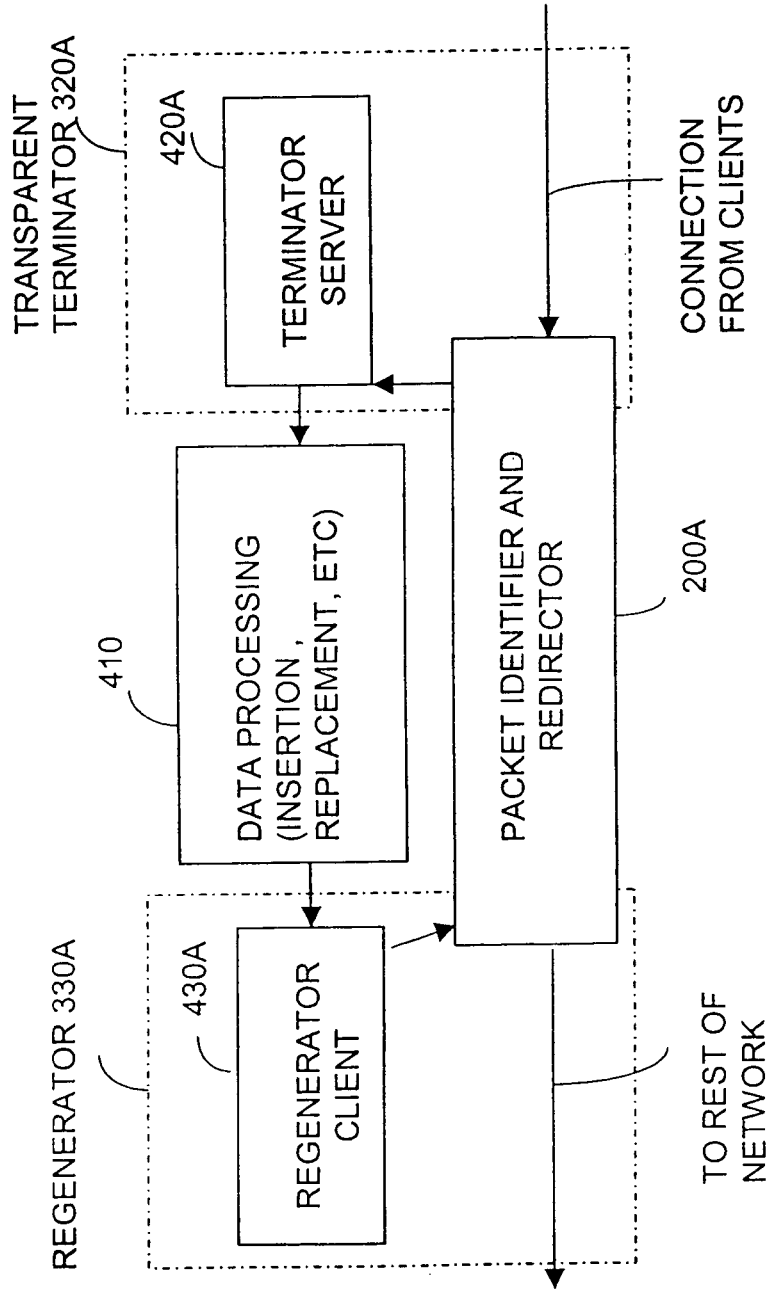
FIG. 6 is a block diagram showing a first embodiment of the Interception system of FIG. 5.

FIG. 6 is a block diagram showing a first embodiment of the Interception system 300 of FIG. 5. The interception system 300 of FIG. 6 is provided between a socket client and a socket server (not shown). Arrows show data flow from the socket client (not shown) originating a connection to the socket server (not shown). Data from the socket server to the socket client can be handled in the same manner as that of the data from the client to the server.

The interception system 300 of FIG. 6 includes a packet identifier and redirector 200A, a transparent terminator 320A, a regenerator 330A and a data processor 410.

The packet identifier and redirector 200A of FIG. 6 is similar to the packet identifier and redirector 200 of FIG. 2. The transparent terminator 320A is similar to the transparent terminator 320 of FIG. 5. The regenerator 330A is similar to the regenerator 330 of FIG. 5. The packet identifier and Redirector 200A is used to create the transparent terminator 320A and the Regenerator 330A.

The transparent terminator 320A has a terminator server 420A. The regenerator 330A has a regenerator client 430A. The packet identifier and redirector 200A has the functionality of redirecting packets to a standard socket Server and of handling packets from a standard socket client. Thus, the packet Identifier and redirector 200A redirects incoming packets to the terminator server 420A and handles packets from the regenerator client 430A The data processor 410 is provided between the terminator server 420A and the regenerator client 430A. The data processor 410 has functionality of operating on data contents, such as data processing, data insertion, data replacement, encryption, decryption, compression, decompression, data conversion.

The packet identifier and redirector 200A examines information in each packet that is part of a stream and passes through the packet identifier and redirector 200A, and determines whether the stream should be intercepted. The information may be a flag, identifier or a port number and/or address included in packets. The flag may be included in at least the first packet header. The identifier may be included in the contents of the packets. In some situations, all streams may be intercepted.

If the packet identifier and redirector 200A identifies that the packet should be intercepted by the terminator server 420A, the packet is redirected to the terminator server 420A, rather than being routed further along the network. The terminator server 420A establishes its own socket connection to the socket client that sent the packet. The terminator server 420A becomes a virtual server to the socket client.

The regenerator client 430A opens a transparent connection to the server by using the packet identifier and redirector 200A. In the transparent connection, the packet Identifier and redirector 200A modifies the source address (and port number if applicable). If the transparent connection is not required, packets from the regenerator client 430A do not need to pass through the packet identifier and redirector 200A. The regenerator client 430A uses its own address as the source address.

Once the connection between a socket server and a socket client is established through the transparent terminator 320A and the regenerator 330A, the data processor 410 receives data from the server or the client.

The data processor 410 manipulates data from the client or from the server to perform operations on the data such as (but not limited to) encryption, compression, decryption, decompression, data conversion, data insertion, or data replacement.

The data processor 410 can replace all incoming data with new data. When all data from a socket server is replaced, the interception system of FIG. 6 does not need the functionality of the regenerator 430A as a socket connection to the socket server is not required. The transparent terminator 320A may provide all data destined for the socket client (or the socket server).

Figure 7:
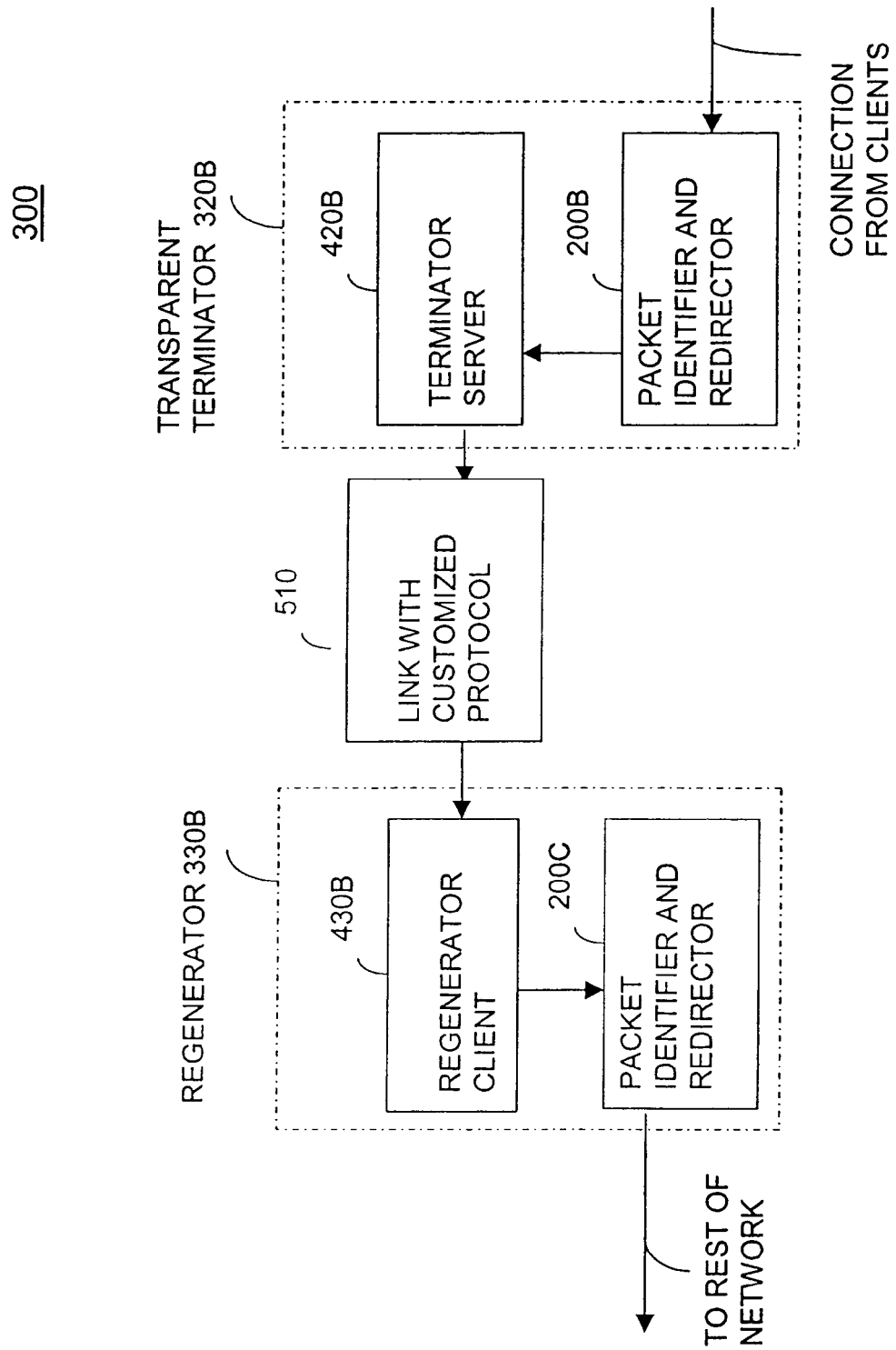
FIG. 7 is a block diagram showing a second embodiment of the interception system of FIG. 5.

FIG. 7 is a block diagram showing a second embodiment of the interception system 300 of FIG. 5. Arrows show data flow from a socket client (not shown) originating a connection to a socket server (not shown). Data from the server to the client flows along the same paths but in the opposite direction.

The interception system 300 of FIG. 7 includes a transparent terminator 320B and a regenerator 330B. The transparent terminator 320B includes a packet identifier and redirector 200B and a terminator server 420B. The regenerator 330B includes a packet identifier and redirector 200C and a regenerator client 430B. The transparent terminator 320B is connected to a socket client (not shown) and the regenerator 330B is connected to a socket server (not shown).

The packet Identifier and redirectors 200B and 200C are similar to the packet identifier and redirector 200 of FIG. 2. The transparent terminator 320B is similar to the transparent terminator 320 of FIG. 5. The regenerator 330B is similar to the regenerator 330 of FIG. 5.

The transparent terminator 320B is connected to the regenerator 330B through a communication link with a customized protocol 510. The transparent terminator 320B may be provided in a subsystem that is different from that of the regenerator 330B.

The packet identifier and redirector 200B inspects a packet. If the socket connection formed by the packet should be intercepted by the terminator server 420B, the packet identifier and redirector 200B redirects the packet to the terminator server 420B, rather than being routed further along the network (if applicable). The terminator server 420B establishes its own socket connection to a socket client that has sent the packet. The terminator server 420B becomes a virtual server to the socket client. The regenerator 330B becomes a client to the socket server through a transparent connection or a non-transparent connection. Packets from the socket server are redirected to the regenerator client 430B through the packet identifier and redirector 200C.

The regenerator client 430B and the terminator server 420B receive data from a socket server or a socket client and replace protocols of incoming data with a suitable protocol 510 to communicate with each other. For example, UDP can be used between the transparent terminator 320B and the regenerator 330B, when the server and client use TCP.

The interception system 300 of FIG. 7 can operate bi-directionally by having the terminator server and the regenerator client on each side of the diagram.

The difference between FIGS. 6 and 7 is that the functionality is split between two subsystems, one on each side of the link. This does not change the basic functionality of the interception system.

In these Figures, the interception system works bi-directionally and is not limited to clients connecting to the terminator server, and that data flows between the socket client and socket server in either or both directions.

The transparent interception of the embodiment of the present invention can be applied to a device for policies implementation. For example, the device having the functionality of the transparent interception may restrict or guarantee a certain network bandwidth for a particular use transparently.

The transparent interception of the embodiment of the present invention can be applied to a device that manages data flowing or network resources.

A method of achieving transparent interception by changing the source and/or destination address and port number of socket packets and redirecting them to an alternate server is described.

Various techniques can be used to implement the transparent Interception of the interception system (i.e. 100, 300 of FIGS. 1, 2 and 5-7). One of the techniques is to redirect packets to a socket with a different address by modifying the destination (and possibly source) addresses (and ports of applicable) of the packets and placing them in the network stack.

Figure 8:
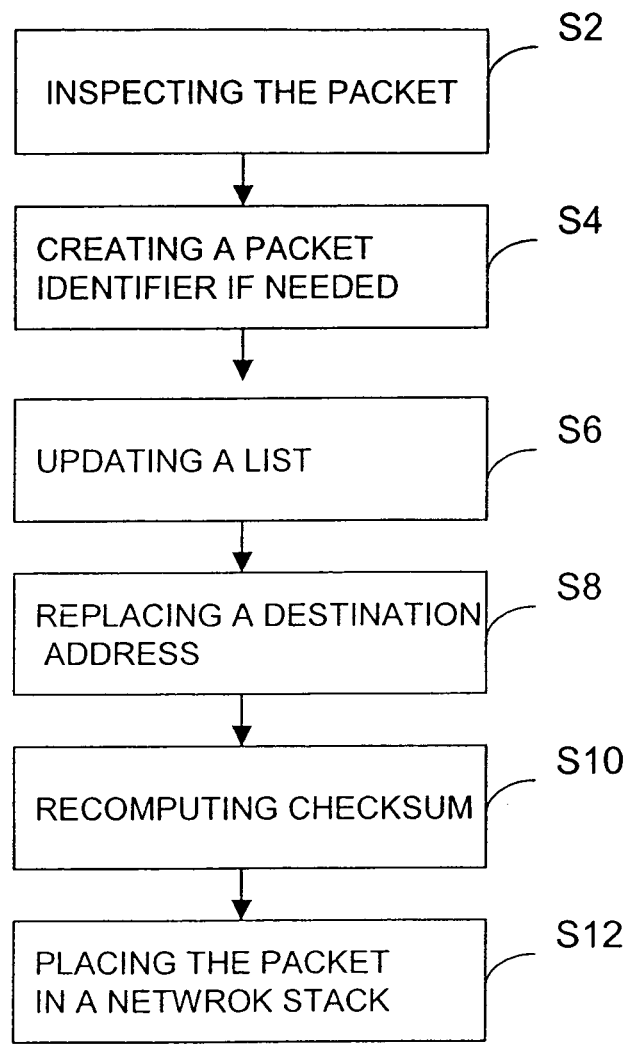
FIG. 8 is a flow diagram showing a first embodiment of the implementation of the transparent interception.

FIG. 8 is a flow diagram showing a first embodiment of the implementation of the transparent interception. The transparent interception of FIG. 8 is implemented by packet address (and port number) modification and placing the packets back into the network stack. In step S2, when a packet passes through an interception system, such as the stream concentrator 100 or the interception system 300 of FIGS. 1, 2 and 5-7, the interception system inspects the packet. The interception system looks at its protocol type. If it is a socket packet, the interception system looks at its protocol, its source and destination address and port type.

In step S4, if the information of the packet is not on a list described below and it is determined that the packet is the first packet of a stream that should be intercepted, a packet identifier is created. For example, an identification number (ID number) is assigned to the connection.

In step S6, an entry is made into the list. The list is continuously updated to keep the information of all sockets that have been redirected. The list may contain the ID number, the source and destination address, and the port number of the socket connection that has been intercepted.

In step S8, the destination address and/or port number in the packet is replaced such that the packet is directed to a socket server (e.g. terminator server 420A or 420B) on the interception system. The source address and port number do not need to be replaced. However, the source address and port number may be replaced, if it is desirable to carry information, such as the assigned socket ID number.

In step S10, after the address and/or port number is altered, the packet checksum(s) is recomputed to reflect the altered packet contents. Contents other than the addresses, ports and checksums are not changed. In step S12, the packet is now placed in the network stack of the Interception system and is routed to the Interception system.

A socket server (e.g. terminator server 420A or 420B) is waiting for the intercepted and redirected packet. The socket server forms a socket connection using the operating environment's built in networking code. At this point, the socket server may review the list to obtain full details of packet connections, such as original source and destination addresses and port numbers. The socket server may look at the source port number and/or address to obtain the socket ID number (depending on where the socket ID number would have been embedded into the packets as described above) and then use that socket ID number to obtain the entry in the list which contains the full details (i.e. original source and destination addresses, ports number etc).

Subsequent packets flowing in either direction are redirected appropriately by comparing with ports and address numbers stored in the list.

A similar process can be applied to socket connections where the Transparent Interceptor is a client so that the connection is transparent to the server (i.e. the original socket destination).

Figure 9:
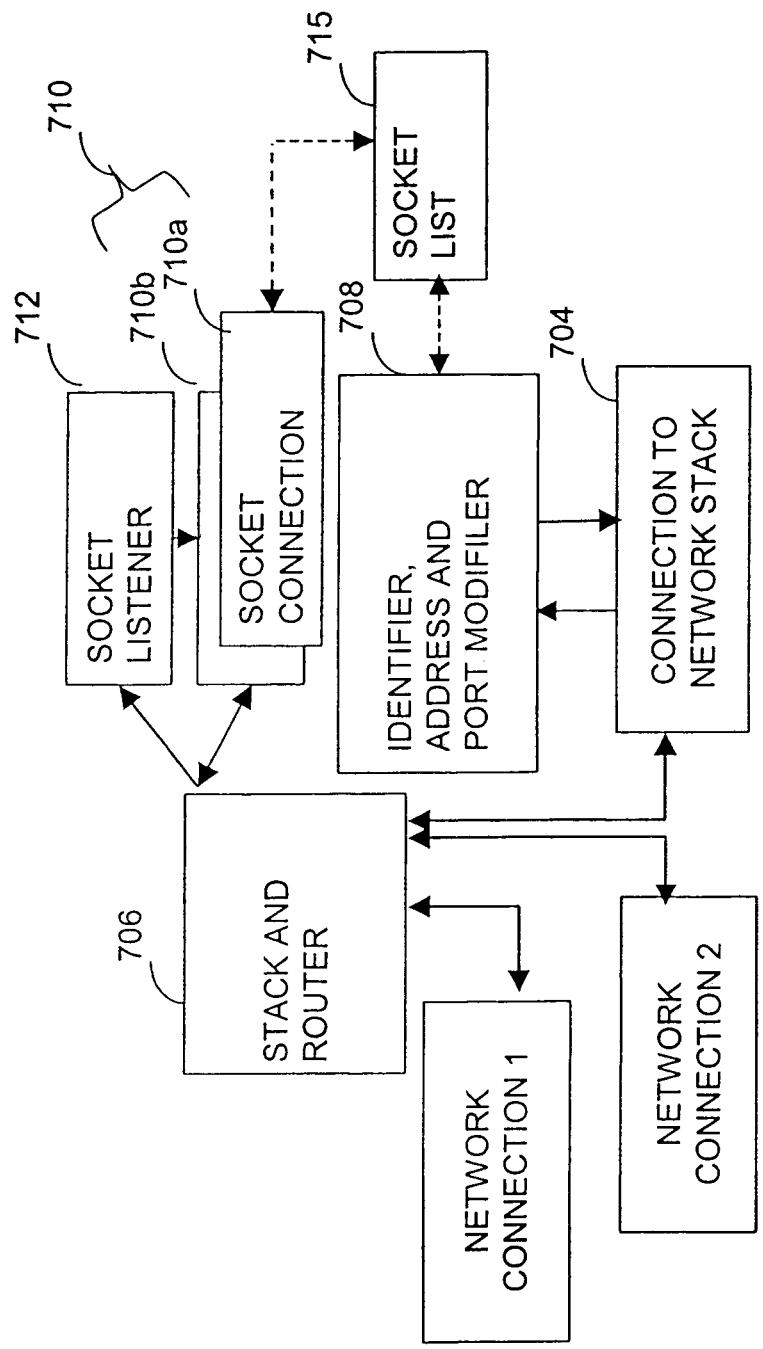
FIG. 9 is a block diagram showing a second embodiment of implementation of the transparent interception using built-in routing and the socket functionality of a typical operating system.
Figure 10:
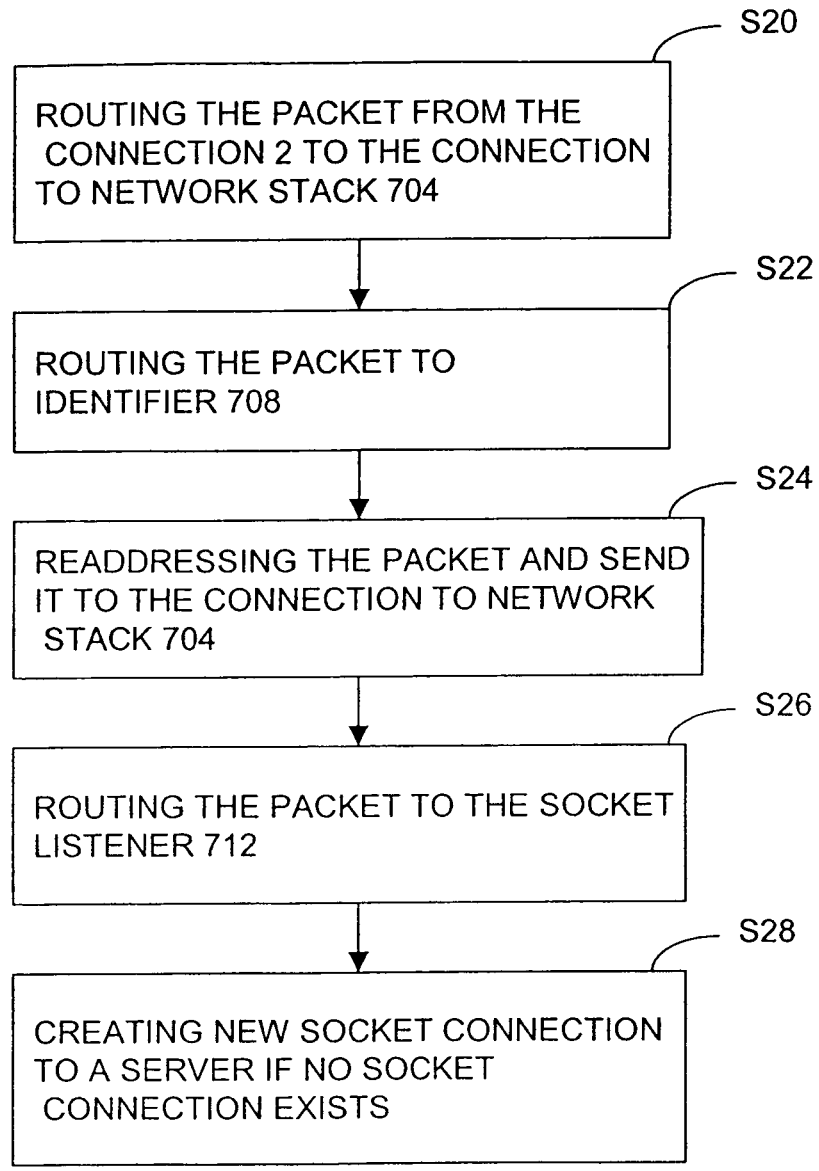
FIG. 10 is a flow diagram showing the operation of the transparent Interception of FIG. 9.

Throughout this process, a standard or modified router, such as a router built into Unix™, Linux™ or Windows™ systems, can be used to redirect packets from the interception system (i.e. 100, 300 of FIGS. 1, 5-7) to hardware network connections, a socket client built in the interception system or a socket server built in the interception system. FIG. 9 is a block diagram showing a second embodiment of implementation of the transparent Interception. The transparent Interception of FIG. 9 is implemented by using built-in routing and the socket functionality of a typical operating system. FIG. 10 is a flow diagram showing the operation of the transparent interception of FIG. 9.

Network connections 1 and 2 represent physical network cards. connection to network stack 704 implements a connection, such as the Ethertap or Tuntap device available in Linux™. Socket connections 710 represent socket connections to servers that have been already established.

In FIG. 9, the built-in router is used to route packets between one or more network connections, and a socket server built in the interception system or a socket client built in the interception system. The built-in router may include additional functionality or enhanced functionality depending on routing needs.

In FIG. 9, "redirection" of the packet is implemented by modifying packet address and/or port numbers. Socket list 715 keeps track of packet re-addressing information.

Referring to FIGS. 9 and 10, a packet flow from the network connection 2 to the network connection 1 is described. A packet from a socket client enters from one network segment attached to the network connection 2 with a source address requiring routing a network segment attached to the network connection 1.

In step S20, the packet enters the network connection 2 and is routed to the connection to network stack 704 through a stack and router 706.

In step S22, the packet is sent to an Identifier 708. In this example, it is assumed that the packet forms a socket connection to a specific server. In step S24, the packet is re-addressed and is sent back to the connection to network stack 704.

In step S26, the packet is routed through the stack and router 706 to socket listener 712 that forms the endpoint to the socket connection.

In step S28, if no socket connection to the requesting client exists, a socket connection to the client is created (e.g. socket connection 710*a*). Data streams can now flow between the requesting client and the socket connection formed by the transparent interception, with the client being unaware that it is connected to a server other than the one it originally attempted to connect to. A separate socket connection to the server (which the client believes it is connected to) can also be established through network connection 1 at this point if desired (i.e. if data needs to be sent to or received from the server depending on the operation that is being performed). If the system is to be transparent to the server, packets for this connection can also be routed through the Identifier, address and port modifier 708 before exiting through network connection 1. Typically, the bulk of data moves from a server side to a client side that originated the connection.

Socket style connections may involve data and/or control packets flowing in both directions. Hence, re-addressing operations, such as step S24, are bi-directional. The socket list 715 may be used to keep track of how to re-address appropriate packets flowing in either direction. The socket list 715 can also be used to keep track of which data streams are already open and are handled.

Figure 11:
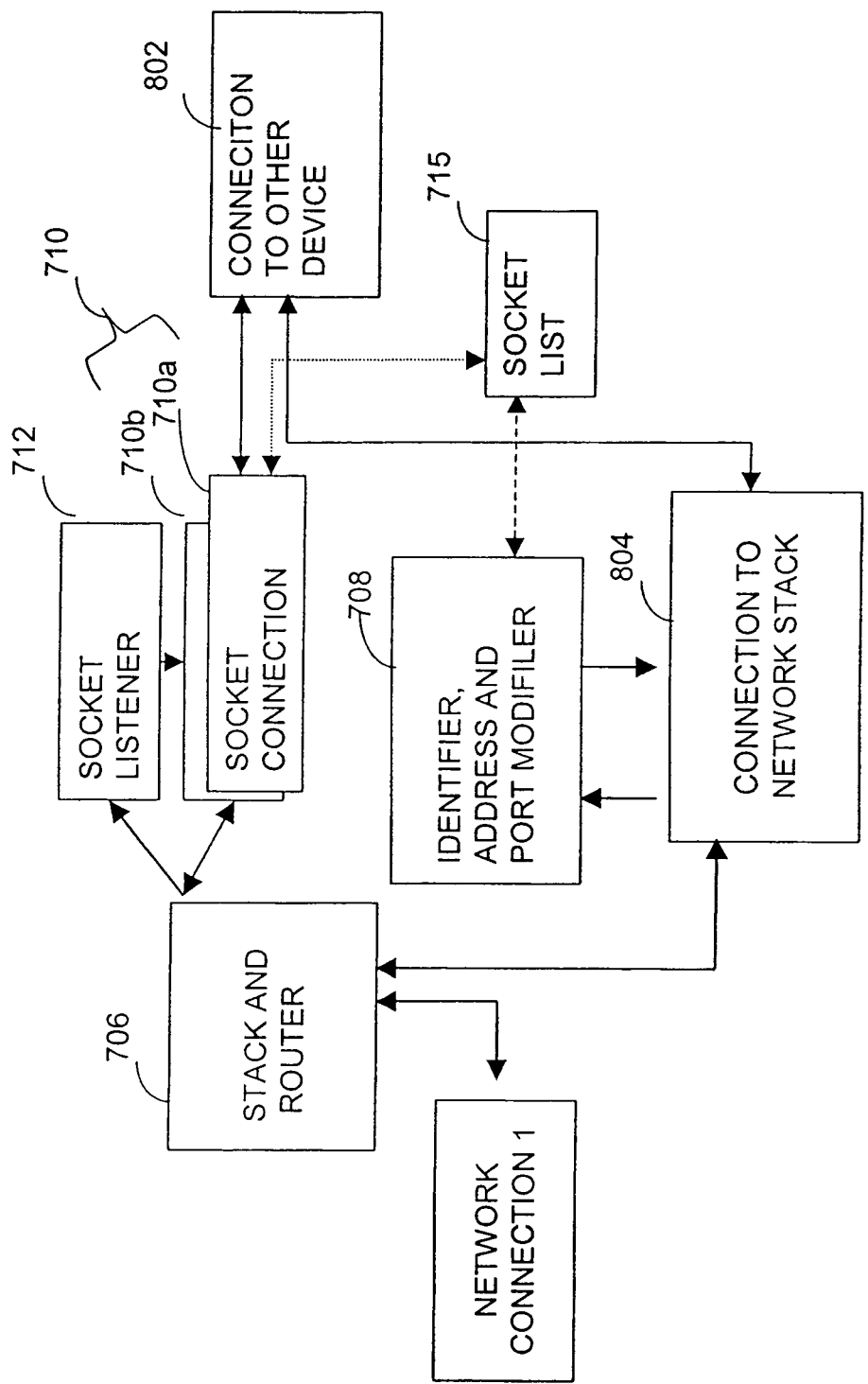
FIG. 11 is a block diagram showing a third embodiment of the implementation of the transparent interception for the protocol modification.

A similar process can be used to implement functionality, such as protocol modification. FIG. 11 is a block diagram showing a third embodiment of the implementation of the transparent interception for the protocol modification. The transparent interception of FIG. 11 is implemented by using built-in routing and the socket functionality of a typical operating system. In FIG. 11, the connection to network stack 704 is replaced with connection to network stack (e.g. Ethertap) 804. The connection to network stack 804 is connected to connection to other device 802. The connection to other device 802 is connected to the socket connections 710.

As described in FIG. 11, the required routing functionality is simplified by having just one network card (network connection 1) and one Ethertap or Tuntap connection (connection to network stack 804). The system of FIG. 11 effectively passes packets from one device to the other (i.e. input from network connection 1 to connection to network stack 804 vice-versa).

When a client type connection is made from this device (i.e. the intercepting system) to a server in place of a direct connection to the server from the requesting client, it may be preferable in some situations to alter the device's address in the packets traveling between the server and this device in order to make the server believe it is communicating directly to the actual client's address, not the intercepting system's address. In this situation, port and/or address modification as described above may be used. This may be particularly important for one-to-one situations (protocol modification, data format conversion, data insertion or alternation) where the server relies on the address of the client for security, geographic location or other information.

The packet redirection functionality can be achieved by changing the source and/or destination address and port number of packets and redirecting them to an alternate data stream server.

Packets enter the stream concentrator 100 or the interception system 300 through one or more network connection interfaces, and are routed by a built-in or enhanced built-in router functionality. Packets whose port or address numbers should be altered are sent to the identifier, address and port modifier 708. After modification, they are returned to the router 706. Using this redirection process, packets forming streams that are to be intercepted are directed through the system stack to the socket listener 712 (server) and/or socket connection (client or server) interface that handles the raw data stream. This approach can also be used for transparent protocol modification, data format modification or content insertion/modification by replacing the socket stream data duplicator 150 of FIG. 2 with protocol modification, data format modification or content insertion/modification functionality as appropriate.

Figure 12:
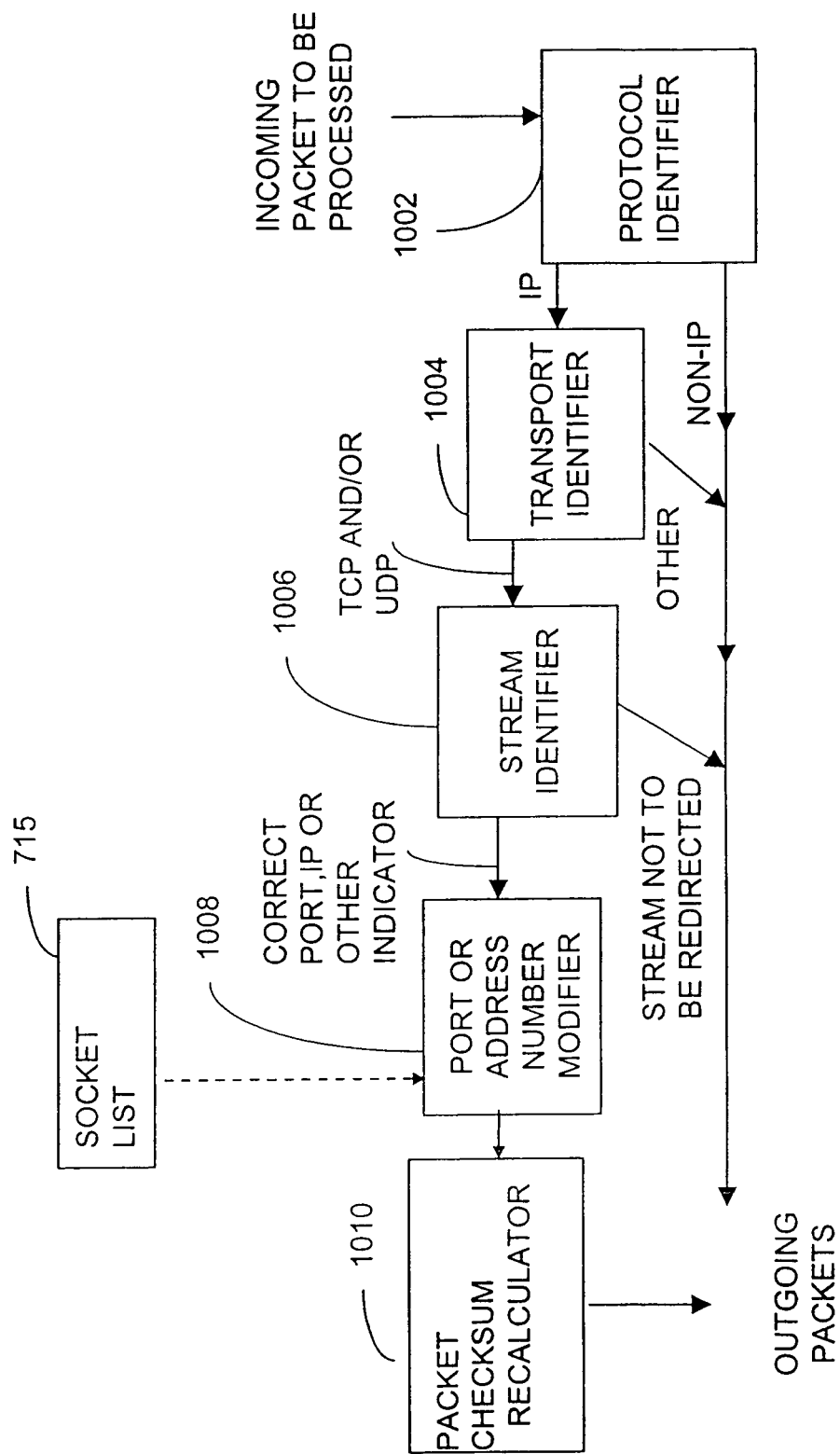
FIG. 12 is a schematic diagram showing a first embodiment of the packet identifier and redirector for TCP or UDP packets.

FIG. 12 is a schematic diagram showing a first embodiment of the Packet Identifier and Redirector of FIGS. 2 and 5-7 for TCP or UDP packets. In FIG. 12, there are three identifiers, protocol identifier 1002, transport identifier 1004 and stream identifier 1006.

A packet passes through the protocol identifier 1002, transport identifier 1004 and stream identifier 1006. The protocol identifier 1002 and the transport identifier 1004 inspect the protocol (i.e. IP) and transport mechanism (i.e. TCP or UDP). If TCP/IP or UDP/IP is used, the stream identifier 1006 examines information about the stream itself, such as addresses, port numbers, flags, and entries in the socket list 715 etc, to determine if the stream is one that should be redirected.

If the packet is part of a stream that should be redirected, port or address number modifier 1008 modifies the destination address and/or port numbers. The port or address number modifier 1008 modifies the source address, if required. The port or address number modifier 1008 uses information read from the socket list 715. The socket list 715 is automatically updated to make new list entries for new streams.

The packet checksum recalculator 1010 then calculates the checksums of the modified packet. The packet is returned to the network system (e.g. the network stack) where it is routed to the desired location based on the new packet addresses.

The protocol identifier 1002, the transport identifier 1004 or the stream identifier 1006 is provided depending on the requirements of the particular implementation or use of the system. The protocol identifier 1002 may identify a packet after the transport Identifier 1004 identifies the packet. The protocol identifier 1002 and the transport identifier 1004 may identify the packet after the stream identifier 1006 makes identification.

The protocol and transport identifications, protocol and stream identifications or transport and stream identifications may be combined. protocol, transport and stream identifications may be combined, and order of operations may be changed.

The port or address number modifier 1008 is provided depending on the requirements of the particular implementation or use of the system. In FIG. 12, address and/or port number are modified. However, in some applications, the port or address number modifier 1008 may be replaced with a module which modifies other aspects of the packet, such as setting a flag or adding an identification number. The flag may be used by a specialized routing mechanism to identify the packet. The identification number may be used to tag the packet for a particular type of processing later on.

The functionality of transparent interception and data duplication of the stream concentrator 100 of FIG. 1 achieves true network broadcasting.

By placing the stream concentrators 100 in various locations throughout the network, large numbers of data streams can be combined into a small number of streams that the server can manage.

True network broadcasting also can be achieved by including the stream concentrator 100 in network devices that provide routing functionality such as (but not limited to) switches, gateways, and routers at various locations of a network.

Once the functionality of the stream concentrator 100 is provided across a network, either as separate stream concentrator devices or by being included in other devices, the network becomes broadcast enabled allowing virtually any machine on the network to be a broadcast stream server. It is noted that the architecture of the network is likely to be designed so as to make it more practical to broadcast from some locations than from others.

A device including the functionality of transparent interception or data duplication of the interception system (i.e. 100, 300) can alter or manipulate the data that is passing through the device. The data processor 410 of FIG. 6 may be used for (but is not limited to) changing sample rates and/or encoding method of audio streams, changing resolution and/or encoding method of video streams, changing compression method of web page images, filtering the content of web pages to reduce bandwidth required for low bandwidth links, or performing automatic translation of web page content into a particular language.

A device including the functionality of socket interception or data duplication of the interception system (i.e. 100, 300) can insert content into a data stream originating from a client or a server or replace part of the data stream with the content.

This content may be advertising, local information or other data. An appropriate stream data format may be used in order to minimize the effort needed to do this, or if the server is to control the position in the stream where the local content is to be inserted.

This is also applicable to non-streaming applications such as web-pages, where the functionality in accordance with the embodiment of the present invention may be used to add or remove content from specific web-pages, or replace specific web pages themselves.

The broadcasting and data modification technique of the interception system (i.e. 100, 300) may be used in emergency warning system (for disasters etc). The warning system can replace any/every web page or other stream data that a user is attempting to access with a stream containing an emergency message.

Application transparent TCP/IP protocol modifications for wireless or other links is described.

TCP/IP is commonly used for many socket connections, but suffers from well known data throughput and timeout problems when used across links with significant packet error rates or round-trip times. By using transparent interception, termination and regeneration of socket connections of the interception system (i.e. 100, 300) around a link, and using a more appropriate protocol to carry the stream across the link, it is possible to have a non-degrading socket connection across such a link.

Figure 13:
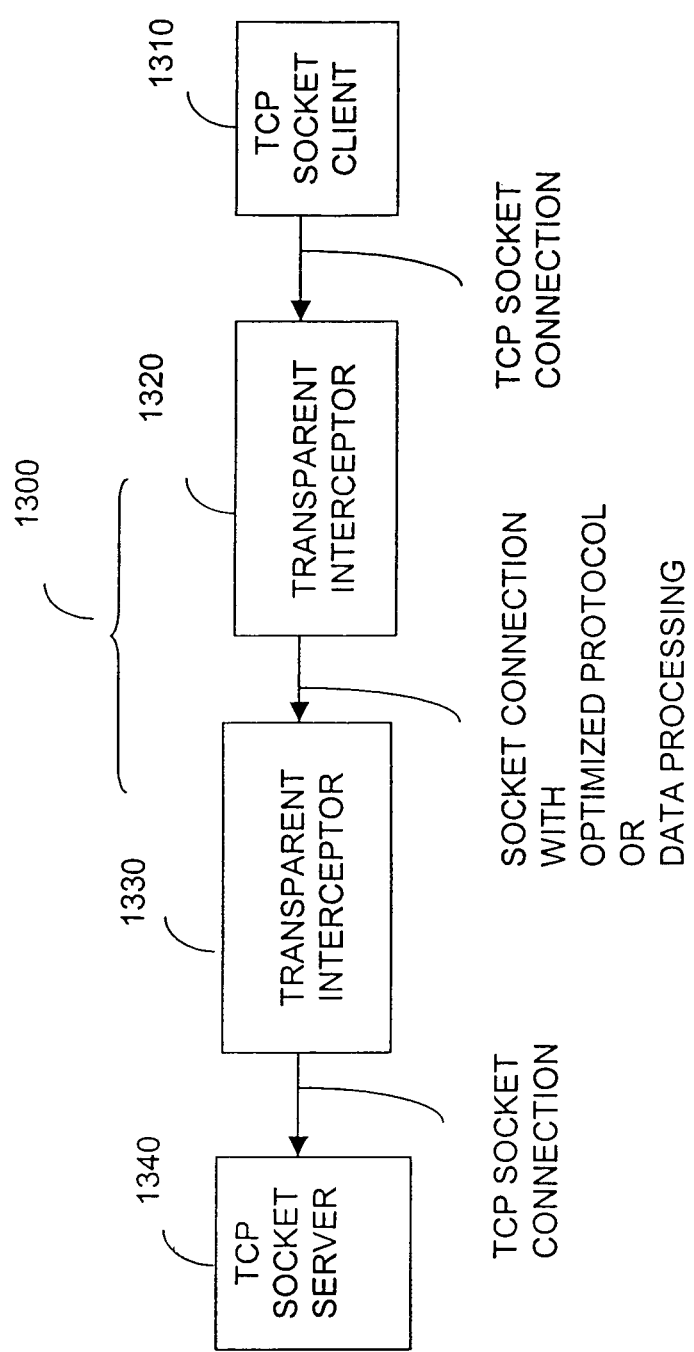
FIG. 13 is a block diagram illustrating an interception system for TCP/IP socket connections in accordance with a third embodiment of the present invention.

FIG. 13 is a block diagram illustrating an interception system 1300 in accordance with a third embodiment of the present invention. The interception system 1300 is implemented for TCP/IP socket connections. Arrows are shown pointing from a device that originates a connection to a device that receives the connection.

The interception system shown in FIG. 13 includes transparent interceptors 1320 and 1330. The transparent interceptors 1320 and 1330 may have some or all of the functionality described above in FIGS. 1 to 12.

TCP socket client 1310 communicates with TCP socket server 1340 with a TCP/IP socket. The transparent interceptors 1320 and 1330 are provided between the TCP socket client 1310 and the TCP socket server 1340. The Transparent Interceptor 1320 forms the TCP/IP connection with the TCP socket client 1310 and the transparent interceptor 1330 forms the TCP/IP connection with the TCP socket server 1340.

The transparent interceptors 1320 and 1330 can form a connection or link to communicate with each other with a non-TCP/IP protocol that may be more appropriate or optimized for the link between the transparent interceptors 1320 and 1330, without the TCP socket server 1340 or the TCP socket client 1310 being aware that this is happening or requiring any alterations themselves or to their network stack and/or TCP/IP implementations.

Data processor (i.e. 410 of FIG. 6) for modifying data may be provided between the transparent interceptors 1320 and 1330. In this case, data can be processed, modified or altered, without the server or the client being aware that this is happening.

Because the socket connection appears as if it is standard TCP/IP to the client and server applications connecting to each other on either side of the link, this technique does not require any modification of application software and is therefore fully compatible with the millions of existing TCP/IP compatible machines that make up the Internet.

The same technique may be used for protocol and/or layer modification or protocol modification of other network transport and/or protocol systems.

The interception system 100 and 300 can be applied to other network protocols (e.g. Internetwork Packet eXchange: IPX). The term "packets" is taken to mean the appropriate information entity for the system being used, and "data" can mean any type of information. Terms such as "server" and "clients" are used as names of typical endpoints of data streams, but are not meant to restrict the meaning from covering other types of endpoints.

Numerous modifications, variations and adaptations may be made to the particular embodiments of the invention described in the documents attached herein, without departing from the scope of the invention, which is defined in the claims.

What is claimed is:

1. A method of managing network traffic over a network connection between a client and a server, the network connection including a plurality of segments, the method comprising the steps of:

intercepting a client packet transmission from the client addressed to the server at a client interconnect point, the client interconnect point and the client defining a first segment of the plurality of segments; the first segment using a first communication protocol; the client interconnect point being located before a second segment of the plurality of segments, the client interconnect point accessing packets in the client packet transmission;

replacing the packets in the client packet transmission into a second communication protocol at the client interconnect point;

forwarding the client packet transmission from the client interconnect point through the second segment to a server interconnect point using the second communication protocol, the server interconnect point and the server defining a third segment of the plurality of segments;

replacing the packets in the client packet transmission into the first communication protocol at the server interconnect point; and transmitting the client packet transmission from the server interconnect point to the server through the third segment using the first communication protocol;

wherein the client interconnect point includes a terminator server having a terminator server address; wherein the server interconnect point includes a regenerator client having a regenerator client address;

wherein the client packet transmission comprise data packets, the data packets having a source address identifying the client and a destination address identifying the server;

wherein the step of intercepting a client packet transmission comprises the step of:

re-addressing at the client interconnect point the data packets resulting in the destination address being the terminator server address.

2. The method as claimed in claim 1, further comprising the steps of:
intercepting a server packet transmission from the server addressed to the client at the server interconnect point;
forwarding the server packet transmission from the server interconnect point through the second segment to the client interconnect point using the second communication protocol; and
transmitting the server packet transmission from the client interconnect point to the client through the first segment using the first communication protocol.

3. The method as claimed in claim 2, wherein the client interconnect point includes a terminator server having a terminator server address; wherein the server interconnect point includes a regenerator client having a regenerator client address; wherein the server packet transmission comprise data packets, the data packets having a source address identifying the server and a destination address identifying the client; wherein the step of intercepting a server packet transmission further comprise the step of:
re-addressing at the server interconnect point the data packets resulting in the destination address being the regenerator client address.

4. The method as claimed in claim 3, wherein the step of transmitting the server packet transmission further comprise the step of:
re-addressing at the client interconnect point the data packets resulting in the source address being the address of the server.

5. The method as claimed in claim 2, further comprising the step of identifying server packets of the server packet transmission by examining:
a source address of the server packets;
a destination address of the server packets; and
a communication protocol used for sending the server packets.

6. The method as claimed in claim 1, wherein the first communication protocol is connection-oriented.

7. The method as claimed in claim 1, wherein the second communication protocol is connection-less.

8. The method as claimed in claim 1, wherein the second communication protocol is a proprietary protocol.

9. The method as claimed in claim 1, wherein the second segment is a disadvantaged segment.

10. The method as claimed in claim 1, wherein the first communication protocol is TCP.

11. The method as claimed in claim 1, wherein the second communication protocol is UDP.

12. The method as claimed in claim 1, wherein the step of transmitting the client packet transmission further comprise the step of:
re-addressing at the server interconnect point the data packets resulting in the source address being the address of the client.

13. The method as claimed in claim 1, wherein the client interconnect point or the server interconnect point is transparent to the client or the server.

14. The method as claimed in claim 1, further comprising the step of identifying a client packet of the client packet transmission by examining:
a source address of the client packet;
a destination address of the client packet; and
a communication protocol used for sending the client packet.

15. The method as claimed in claim 1, wherein the data packets of the client packet transmission are selected from the group consisting of: a connection request packet, a client data packet, a client ACK, a client NACK, and a client control packet; and the data packets of the server packet transmission are selected from the group consisting of: a connection response packet, a server data packet, a server ACK, a server NACK; and a server control packet.

16. The method as claimed in claim 1, further comprising the step of:
storing packet transmission information, the packet transmission information including at least one selected from a group consisting of: an address of the client, a destination port of the client, an address of the server, and a destination port of the server.

17. A system for managing network traffic over a network connection between a client and a server, the network connection including a plurality of segments, the system comprising:
a computer processor;
a client interconnect point intercepting a client packet transmission from the client addressed to the server, the client interconnect point and the client defining a first segment of the plurality of segments; the first segment using a first communication protocol; the client interconnect point being located before a second segment of the plurality of segments, the client interconnect point accessing packets in the client packet transmission, replacing the packets in the client packet transmission into a second communication protocol and forwarding the client packet transmission; the client interconnect point including a terminator server having a terminator server address; the client interconnect point re-addressing the data packets resulting in the destination address being the terminator server address;
a server interconnect point for receiving the client packet transmission from the client interconnect point through the second segment using the second communication protocol, replacing the packets in the client packet transmission into the first communication protocol and forwarding the client packet transmission to the server through a third segment defined by the server interconnect point and the server; the server interconnect point including a regenerator client having a regenerator client address;
wherein the client packet transmission comprise data packets, the data packets having a source address identifying the client and a destination address identifying the server.

18. The system as claimed in claim 17, wherein the server interconnect point
intercepts a server packet transmission from the server addressed to the client forwards the server packet transmission through the second segment to the client interconnect point using the second communication protocol; and
wherein the client interconnect point transmits the server packet transmission to the client through the first segment using the first communication protocol.

19. A non-transitory computer readable storage medium readable by a computer encoding a computer program for execution by the computer to carry out a method of managing network traffic over a network connection between a client and a server, the network connection including a plurality of segments, the computer program comprising:
code means for intercepting a client packet transmission from the client addressed to the server at a client interconnect point, the client interconnect point and the client defining a first segment of the plurality of segments; the first segment using a first communication protocol; the client interconnect point being located before a second segment of the plurality of segments, the client interconnect point accessing packets in the client packet transmission; wherein the client interconnect point includes a terminator server having a terminator server address; wherein the server interconnect point includes a regenerator client having a regenerator client address; wherein the client packet transmission comprise data packets, the data packets having a source address identifying the client and a destination address identifying the server;

code means for re-addressing at the client interconnect point the data packets resulting in the destination address being the terminator server address;

code means for replacing the packets in the client packet transmission into a second communication protocol at the client interconnect point;

code means for forwarding the client packet transmission from the client interconnect point through the second segment to a server interconnect point using a second communication protocol, the server interconnect point and the server defining a third segment of the plurality of segments;

code means for replacing the packets in the client packet transmission into the first communication protocol at the server interconnect point; and code means for transmitting the client packet transmission from the server interconnect point to the server through the third segment using the first communication protocol.

20. The non-transitory computer readable storage medium as claimed in claim 19, further comprising:

code means for intercepting a server packet transmission from the server addressed to the client at the server interconnect point;

code means for forwarding the server packet transmission from the server interconnect point through the second segment to the client interconnect point using the second communication protocol; and code means for transmitting the server packet transmission from the client interconnect point to the client through the first segment using the first communication protocol.

\* \* \* \* \*